(12) United States Patent
Kamijoh et al.

(10) Patent No.: US 7,520,443 B2
(45) Date of Patent: Apr. 21, 2009

(54) SYSTEM, METHOD, AND PROGRAM FOR EXTRACTING INVISIBLE INFORMATION

(75) Inventors: Koichi Kamijoh, Yokohama (JP); Noboru Kamijoh, Fujisawa (JP); Junji Maeda, Tokyo (JP); Masaharu Sakamoto, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 11/611,733

(22) Filed: Dec. 15, 2006

(65) Prior Publication Data

US 2007/0138286 A1   Jun. 21, 2007

(51) Int. Cl.
  *G07K 19/06* (2006.01)
(52) U.S. Cl. .............. 235/494; 235/462.42; 235/472.01
(58) Field of Classification Search ............ 235/462.42, 235/468, 462.01, 472.01, 494
  See application file for complete search history.

(56) References Cited

U.S. PATENT DOCUMENTS

2007/0267500 A1* 11/2007 Juds ...................... 235/462.32

FOREIGN PATENT DOCUMENTS

| JP | 2002-098505 | 10/2003 |
|----|-------------|---------|
| JP | 2003296659 | 10/2003 |
| JP | 2006229894 | 8/2006 |

\* cited by examiner

*Primary Examiner*—Karl D. Frech
(74) *Attorney, Agent, or Firm*—Shimokaji & Associates; Ido Tuchman

(57) ABSTRACT

A method for extracting invisible information from an object in which visible information overlaps with at least part of invisible information formed in stealth ink. The method includes the steps of: irradiating the object with light for making the stealth ink luminous; receiving reflected light from the object; extracting image information from the received reflected light; splitting the image information into a plurality of pieces of color-channel information; obtaining a correlation function between the pixel values of at least two color-channel information selected from the plurality of pieces of color-channel information; reducing a visible information component of selected one of the plurality of pieces of color-channel information to thereby interpolate the color-channel information; and extracting invisible information from the interpolated one piece of color-channel information.

3 Claims, 7 Drawing Sheets

EMBEDDED INFORMATION A
41 × 41 (TYPE 6)
ERROR CORRECTION UP TO 30%

(a)  (b)

(a)  (b)

(a) R  (b) G  (c) B (a)  (b)

(a)

(b)

(a)

(b)

SYSTEM, METHOD, AND PROGRAM FOR EXTRACTING INVISIBLE INFORMATION

CROSS-REFERENCE TO RELATED APPLICATIONS

This application claims priority under 35 U.S.C. § 119 to Japanese Patent Application No. 2005-363767 filed Dec. 16, 2005, the entire text of which is specifically incorporated by reference herein.

BACKGROUND OF THE INVENTION

The present invention generally relates to extracting invisible information, more specifically, relates to a system, a method, and a program for extracting invisible information even if visible information overlaps with the invisible information.

Methods for combining analog media (information) such as paper and digital contents (information) include the following method: first, information such as URL is encoded in a QR code (two-dimensional barcode) or the like; secondly, the QR code is printed in an invisible state on paper in a stealth ink or the like; thirdly, it is imaged by a digital camera or a camera phone under irradiation of light (ultraviolet light or the like) that makes the stealth ink luminous to thereby extract the encoded information (Japanese Unexamined Patent Application Publication No. 2003-296659).

The known method has the advantages of having a good appearance and saving space as compared with a method of printing the QR code or the like in visible ink. This method also has the advantages in embedding overwhelming amount of information in comparison with a method of embedding information by digital watermarking, having high resistance, and not degrading image quality at all.

This method, however, has the problem that when the invisible code and a visible print are printed double, correct invisible information cannot be extracted. In other words, although the QR code has the function of correcting burst errors of a maximum of 30 percent with a Reed-Solomon code, overlapped printing of the invisible code and a visible print may cause an error beyond the error correction capability.

In order to solve the problem, there is a method of printing so as to prevent such overlap as much as possible (Japanese Patent Application No. 2005-044666). However, overlapped printing is sometimes unavoidable in terms of space and so on.

BRIEF SUMMARY OF THE INVENTION

An aspect of the present invention is to extract invisible information even if visible information overlaps with the invisible information.

An aspect of the invention provides a computer program product for extracting invisible information from an object in which visible information overlaps with at least part of invisible information formed in stealth ink. The program product makes a computer function as: means for receiving and storing image information obtained by exposing the object with light that makes the stealth ink luminous; means for splitting the stored image information into a plurality of pieces of color-channel information; means for obtaining a correlation function between pieces of the color-channel information on the pixel values of the image information; means for reducing a visible information component of selected one of the pieces of color-channel information with the correlation function to thereby interpolate the color-channel information; and means for extracting invisible information from the interpolated one piece of color-channel information.

An aspect of the invention provides a system for extracting invisible information from an object in which visible information overlaps with at least part of invisible information formed in stealth ink. The system includes: input means for inputting image information obtained by exposing the object to light that makes the stealth ink luminous; a memory storing the image information; means for processing the image information; a program product stored in the memory; and a display for displaying the extracted invisible information. The program product makes the processing means function as: means for splitting the stored image information into a plurality of pieces of color-channel information; means for obtaining a correlation function between pieces of the color-channel information on the pixel values of the image information; means for reducing a visible information component of selected one of the pieces of color-channel information with the correlation function to thereby interpolate the color-channel information; and means for extracting invisible information from the interpolated one piece of color-channel information.

An aspect of the invention provides a method for extracting invisible information from an object in which visible information overlaps with at least part of invisible information formed in stealth ink. The method includes the steps of: irradiating the object with light for making the stealth ink luminous; receiving reflected light from the object; extracting image information from the received reflected light; splitting the image information into a plurality of pieces of color-channel information; obtaining a correlation function between the pixel values of at least two color-channel information selected from the plurality of pieces of color-channel information; reducing a visible information component of selected one of the plurality of pieces of color-channel information to thereby interpolate the color-channel information; and extracting invisible information from the interpolated one piece of color-channel information.

An aspect of the present invention enables extraction of invisible information overlapping with visible information, which has been impossible, by extracting invisible information from image information that is obtained by reducing the invisible information component for interpolation.

BRIEF DESCRIPTION OF THE SEVERAL VIEWS OF THE DRAWINGS

FIG. 9($b$) plots a stealth-ink portion and other portion according to the part of the image of FIG. 5($a$) surrounded by the square.

DETAILED DESCRIPTION OF THE INVENTION

An embodiment of the present invention will be described hereinafter with reference to a QR code (two-dimensional barcode) formed in invisible ink. Stealth ink in this specification broadly includes invisible ink. Thus, any invisible ink can be used in principle. The invention may be applied to any code (information) other than the QR code provided that it is formed in invisible ink. While the following embodiments directly display extracted information on a display, other examples are possible; for example, you may not directly display extracted information but may access another system using extracted information and display its content (e.g., you may extract URL address of the Internet and display the content in the address), or may record or transmit the extracted information.

Figure 1:
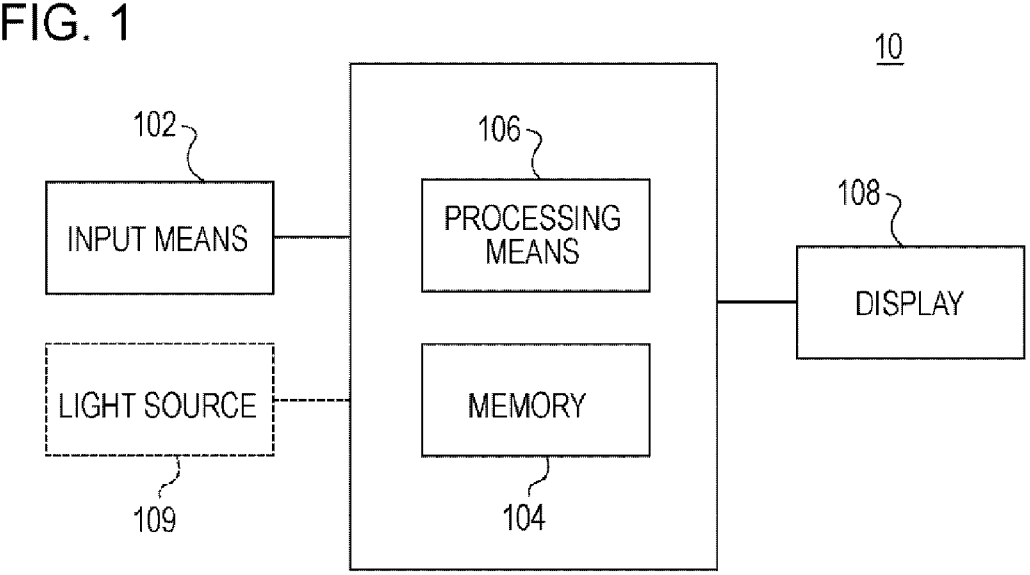
FIG. 1 is a block diagram of a system for the program and the method of the invention.
Figure 2:
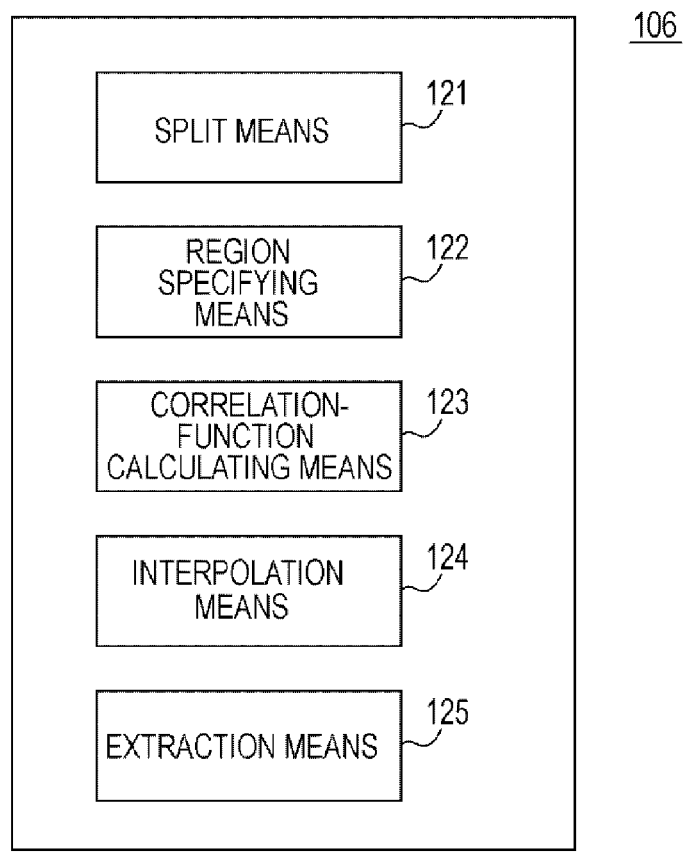
FIG. 2 is a block diagram showing the structure (function) of processing means of the invention.

FIG. 1 is a block diagram of a system for the program and method of the invention, in other words, a system for extracting invisible information. The system includes a computer such as a personal computer (PC) and a portable terminal (device) such as a mobile phone. The system 10 includes input means 102 for inputting image information; a memory 104 for storing image information; processing means 106 for processing image information; and a display 108 for displaying extracted invisible information. The system 10 may further include a light source 109 (indicated by a broken-line block in FIG. 1) that emits light for making stealth ink luminous. The input means 102 may include an optical receiver (camera etc.) receiving reflected light from an object.

The memory 104 stores a program. The program makes the processing means 106 function as split means 121 for splitting image information into a plurality of pieces of color-channel information; region specifying means 122 for specifying a region containing invisible information in the color-channel information; correlation-function calculating means 123 for obtaining a correlation function between color-channel information; interpolation means 124 for reducing a visible information component from color-channel information or new channels calculated from the plurality of pieces of color information for interpolation; and extraction means 125 for extracting invisible information from the interpolated color-channel information. The correlation-function calculating means 123 has the function of finding a variation in the pixel values of color-channel information relative to one selected color-channel information, and calculating the correlation function from the variation.

According to an embodiment, the invisible information is a QR code. The object is printed matter. The invisible information is printed in stealth ink. The visible information includes visible information printed over a QR code. The printed matter includes those printed on paper such as newspaper and magazines and those printed on media other than paper (films, plastics, and walls). The stealth ink includes an ink containing a material that emits light not only by ultraviolet light but also by infrared light or faint X rays.

An embodiment of the invention will be described herein in more detail.

Figure 3:
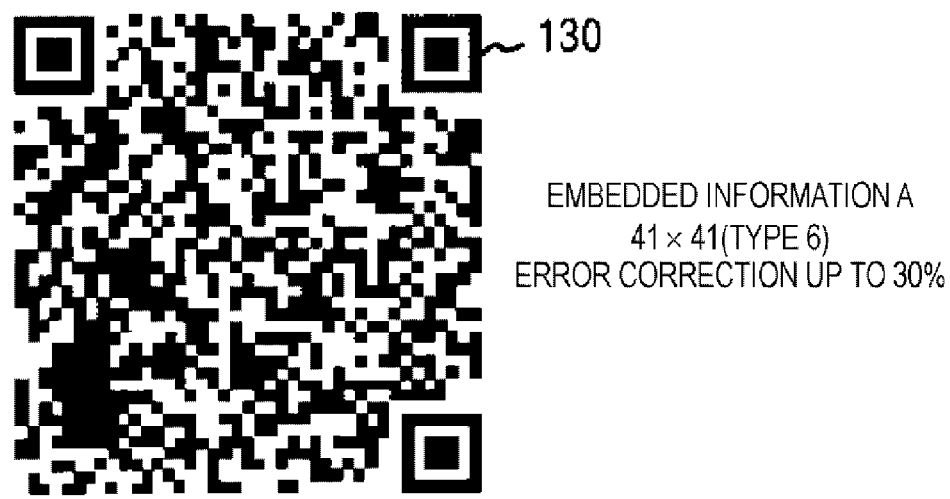
FIG. 3 is a diagram showing an example of a QR code.
Figure 4:
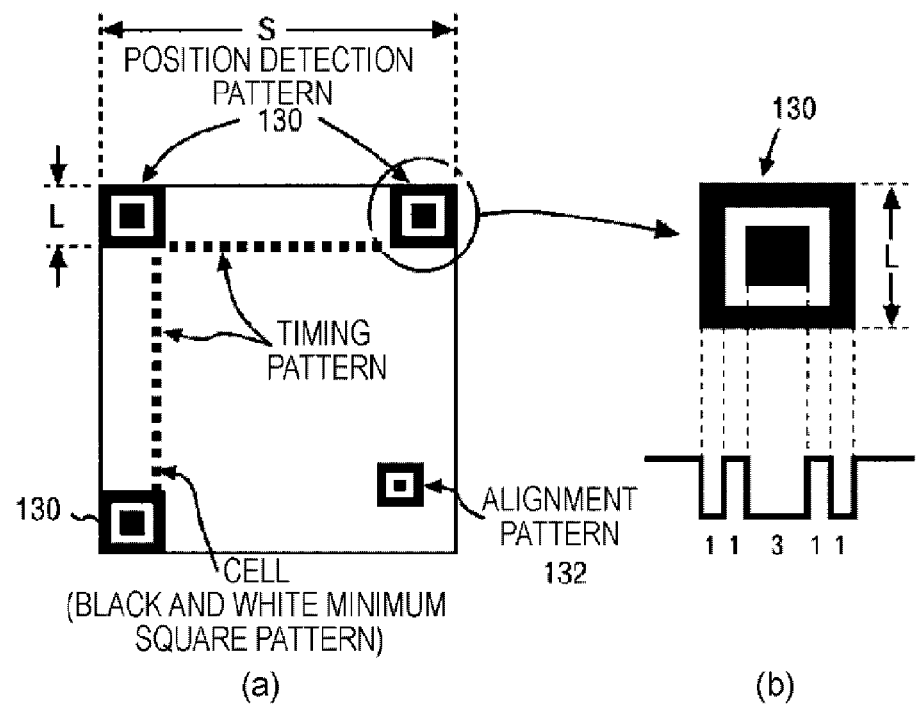
FIG. 4 is a diagram showing the QR code by function.

FIG. 3 is a diagram showing an example of the QR code; and FIG. 4 is a diagram showing the QR code by function. When information is extracted from the QR code, square position detection patterns 130 at three corners in FIGS. 3 and 4(*a*) are found first. The ratio of the lengths (widths) of the black portion and the white portion of the position detection pattern 130 is 1:1:3:1:1 in this order, as shown in FIG. 4(*b*). Then, distortion of the code is corrected with an alignment pattern 132 (a reduced pattern of the position detection pattern 130 on the lower left, or a pattern of alternating black and white cells (the minimum unit of the pattern). The colors (black and white) of the cells are digitized to extract information. The QR code has an error correction function, and can correct burst errors up to 30 percent with a Reed-Solomon code.

A known method for extracting information from a QR code assumes that all the cells are in one color (principally, black or white). Thus, the known method is not for extracting information from a QR code having cells containing two or more colors or different gradations. For example, in the case of the method of Japanese Unexamined patent Application Publication No. 2003-296659, the cells are increased in size to thereby prevent mixture of two or more colors in the cell. Therefore, information from a QR code formed of small cells as in the invention cannot be extracted by the method.

Figure 5:
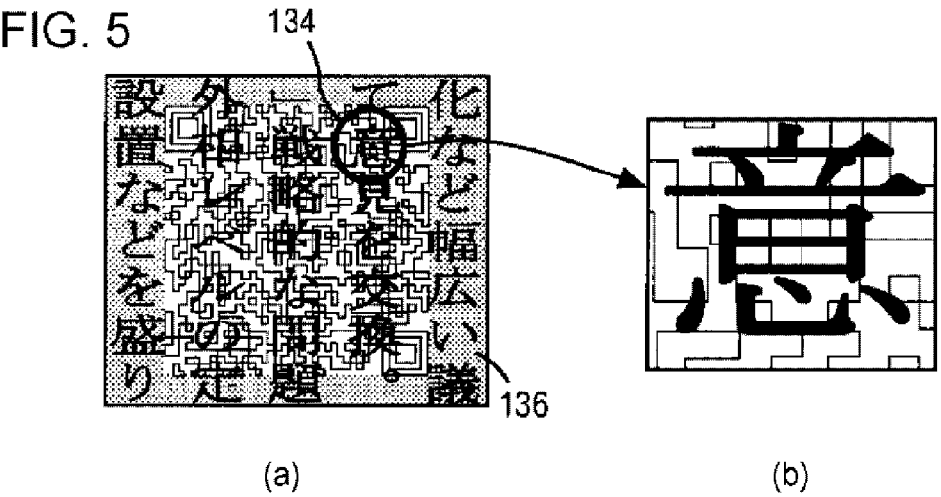
FIG. 5 is a diagram showing an image taken by making a QR code printed on a newspaper in a cyan invisible (stealth) ink luminous with an ultraviolet LED.

FIG. 5 is a diagram showing an image taken by making a QR code printed on a newspaper in a cyan invisible (stealth) ink luminous with an ultraviolet-light emitting diode (LED). When a QR code portion 134 and an original drawing 136 overlap each other like this, the components of the original drawing interferes, preventing the detection of a correct position detection pattern. Even if a correct pattern is detected, the cells in the code information are influenced by the original drawing, so that complete error correction may not be made. FIG. 5(*b*) is an enlarged view the part (surrounded by a small circle) of FIG. 5(*a*). Even if an invisible code and an original drawing (in FIG. 5, a character on newspaper) are printed double, the arrangement of the invention can eliminate the influence of the original drawing to extract correct information from the code that is correctly printed in invisible ink.

Figure 6:
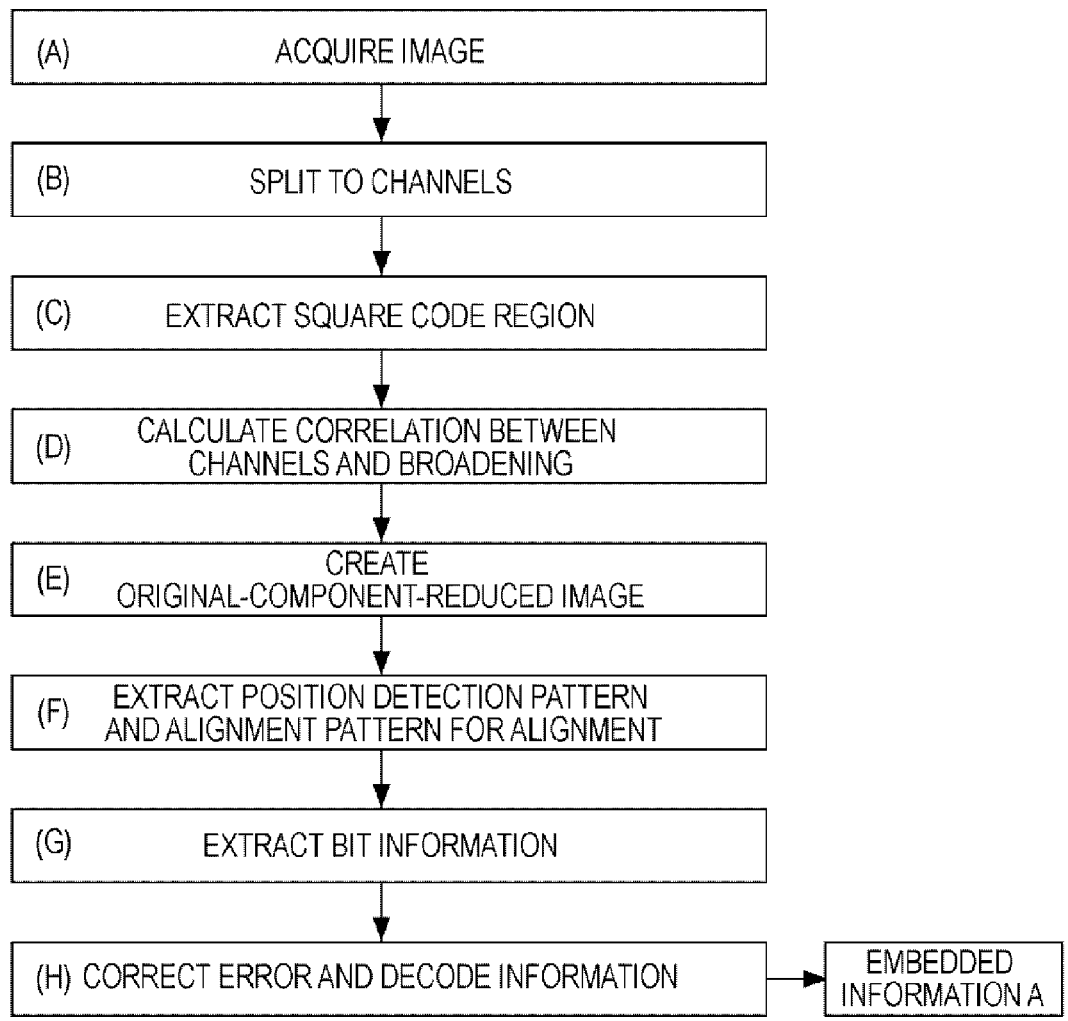
FIG. 6 is a flowchart for the execution (method) of a program according to an embodiment of the invention.

FIG. 6 is a flowchart for the execution (method) of a program according to an embodiment of the invention. According to the invention, an image printed in stealth ink is made luminous with the light of an ultraviolet LED or the like; and its photographed digital image is used as an input; and the image of a QR code reproducing the bit information (1 or 0, black or white) of the cells of the QR code is used as an output. The steps of the flowchart will be described with reference to the image of FIG. 5(*a*) and the QR code of FIG. 3.

(A) Acquiring Image

A QR code (see FIGS. 3 and 5) printed in cyan ink on a newspaper is irradiated with light from an ultraviolet LED with a wavelength of 365 mm and imaged with a digital camera of 640×480 pixels to acquire image information.

(B) Splitting to Channels

Figure 7:
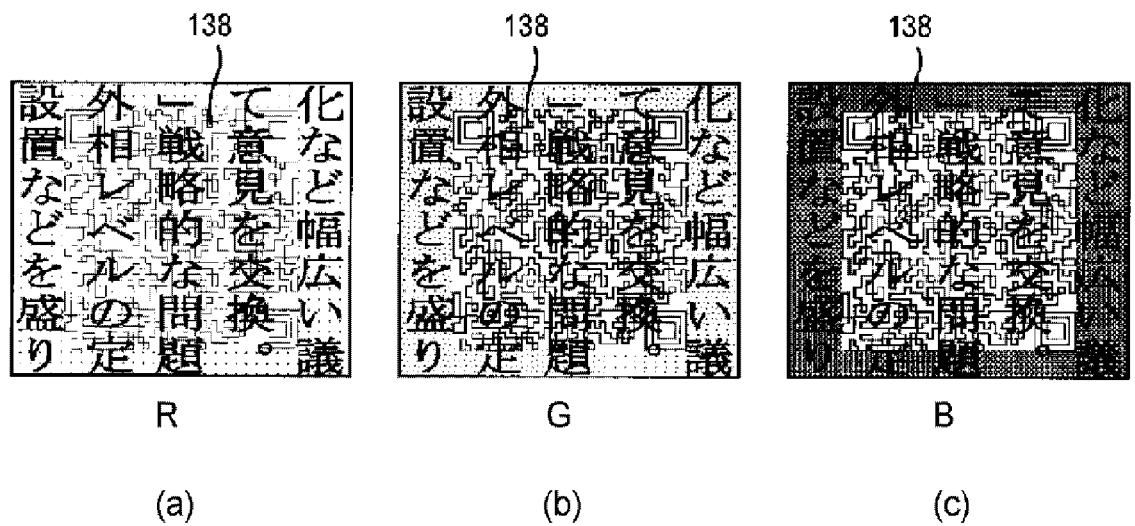
FIG. 7 is a diagram showing the image in FIG. 5 split into three colors of RGB.

The input image is split into RGB, YCbCr, or HSL color channels. The splitting to color channels indicates that an image is output (reconstructed), for example, in red (R), green (G), and blue (B) (in single color). A new channel calculated from the plurality of channels, for example, "(B-channel−R-channel+255)/2 etc." may also be adopted for the invention. FIG. 7 is a diagram showing the image in FIG. 5(*a*) split into RGB. FIG. 7(*a*) shows an image expressed in a red channel, FIG. 7(*b*) shows an image expressed in a green channel, and FIG. 7(*c*) shows an image expressed in a blue channel. The RGB channel splitting will be described hereinafter by way of example.

(C) Extracting Code Region (Square Portion)

Figure 8:
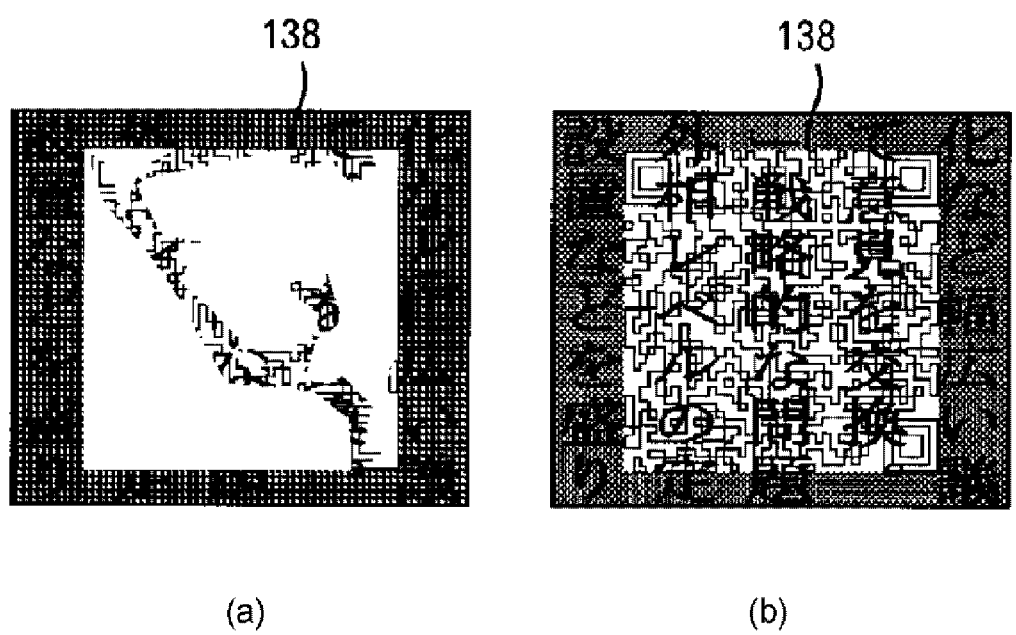
FIG. 8 is the image of B-channel of FIG. 5.

A region (square) 138 including a QR code is then extracted from the image split into channels. In this example, the blue (B)-channel component contains a QR-code component most owing to the combination of an ink (cyan) and an LED (ultraviolet light). In other words, FIG. 7(c) shows the square 138 of the QR code most clearly (with high contrast). Accordingly, the following conversion is first performed using the image of B to rewrite the image by Eq. (Eq. 1)

$$b^m(x, y) = \underset{|\Delta x|,|\Delta y|<E}{\text{MAX}} b(x+\Delta x, y+\Delta y) \quad (1)$$

where b(x, y) is the value (an integer from 0 to 255) of a B component of pixel (x, y), and E is the range of search. In this example, E=10. FIG. 8(a) is an image in a B-channel after the operation of Eq. (1). Although the maximum value is used here, the mean value or the minimum value may be used. An example of a method for extracting a square portion from the image is a method of extracting a square that gives the minimum value of $$\frac{\delta A_B(x, y, d)}{\delta d} \times d \quad (2)$$

where $A_B(x, y, d)$ is the mean of the pixel values of B component of a square, (2d+1) each side, with (x, y) as the center of gravity and d is equal to or larger than a predetermined positive minimum value d_min. FIG. 8(b) is a diagram showing the square 138 specified by Eq. (2) and enclosed with a line.

(D) Calculating Correlation between Channels and Broadening

Figure 9:
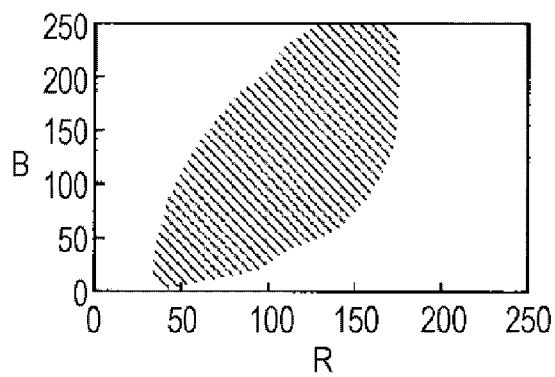
FIG. 9($a$) plots the values of pixels (R, B) of the part of the image of FIG. 5($a$) surrounded by the square.
Figure 9:
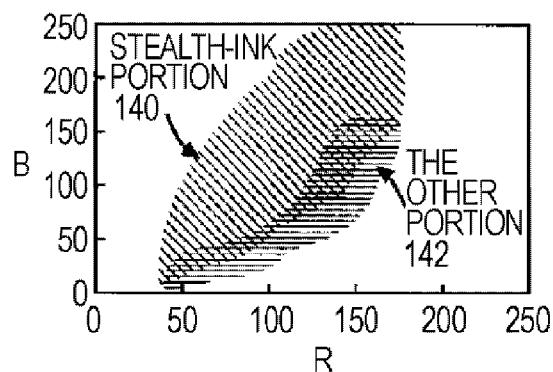

Then, the correlation and broadening of pixel values between channels in the region (square) 138 obtained in (C). FIG. 9(a) plots the values of pixels (R, B) of the part of the image of FIG. 5(a) surrounded by the squire of FIG. 8(b). FIG. 9(b) plots a stealth-ink portion 140 and the other portion 142 thereof. Note that FIG. 9(b) plots them on the assumption that the QR code is known, so that only the diagram of FIG. 9(a) can be drawn. As shown, in the case of the image of FIG. 5(a), R and B have a substantially linear correlation in which the stealth-ink portion and the other portion are separate from each other although with overlapped portions. However, the portion where the value of B is small cannot be reproduced simply by subtracting the pixel value of R from that of B. Therefore, in this system, the following two correlation functions are first obtained, with which the reproducibility of the stealth-ink portion is improved in step (D).

1. The correlation between R and B is expressed as a correlation function f (R).
2. The broadening of the values of B relative to those of R is calculated to find the function g (R) of R.

Where f (R) is an approximation of the values of B relative to those of R into a linear expression by least square approximation, and g (R) is an approximation of the dispersion of the values of B relative to those of R into a linear expression by least square approximation. The value of B may simply be converted as, for example, bi'=(bi−a0ri−c0)α+128 (α is an appropriate coefficient) using only f (R). However, the values will be concentrated around the value 128 because the dispersion of the values of B is small at a portion where the value of R is small. Therefore, the value of B is normalized in inverse proportion to the degree of dispersion as will be described below:

Specifically, f (R) and g (R) are calculated as follows:
[Eq. 3]

$$f(R)=a_0 R+c_0 \quad (3)$$

where
[Eq. 4]

$$a_0=(nZ_0-XY_0)/(nV-X^2), X=\Sigma r_i, Y_0=\Sigma b_i, Z_0=\Sigma r_i b_i,$$
$$V=\Sigma r_i^2, r_i$$

where $r_i$ and $b_i$ mean red pixel value r(x, y) and blue pixel value b(x, y) of pixel i, respectively
$0<=r_i, b_i<=255$), n is the number of pixels
[Eq. 5]

$$g(R)=a_1 R+c_1 \quad (4)$$

where
[Eq. 6]

$$a_1=(nZ_1-XY_1)/(nV-X^2), c_1=(VY_1-Z_1X)/(nV-X^2),$$
$$Y_1=\Sigma y_i, Z_1=\Sigma y_i, Z=\Sigma r_i y_i, y_i=|b_i-a_0 r_i-c_0|$$

When c0<0 or c1<0 holds, a0 and a1 are calculated again by least square approximation if c0=a0 in equation (3), and c1=a1 in equation (4). Although least square approximation is used here, any other function or method other than the least square approximation may be used provided they express the correlation between R and B and broadening.

(E) Creating Original-Component-Reduced Image

The values of B are interpolated using the calculated correlation functions f (R) and g (R) to raise the image of the stealth-ink portion and reduce the influence of the original drawing. Specifically, first, the value $b_i$ is transformed to $b'_i$ by the equation $$b'_i=(b_i-f(r_i))/g(r_i) \quad (5)$$

Secondly, the value $b'_i$ is normalized to $b''_i$ so as to disperse from 0 to 255 by the equation $$b''_i=255(b'_i-\min)/(\max-\min) \quad (6)$$

where min and max are the minimum value and the maximum value of $b'_i$, respectively.

Figure 10:
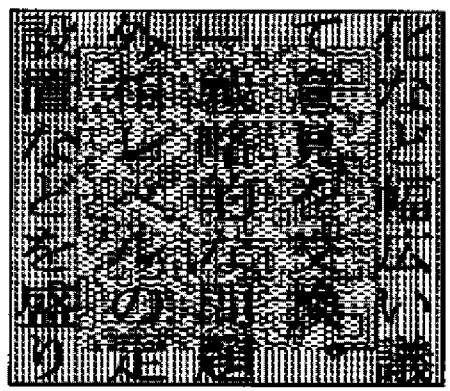
FIG. 10 is an image (reproduced image) in which an original component is reduced from the drawing of FIG. 5($a$).
Figure 10:

FIG. 10(a) is an original-component-reduced (code-portion-enhanced) image produced from the drawing of FIG. 5(a) by the above-described method.

(F) Extracting Position Detection Pattern and Alignment Pattern for Alignment

Thirdly, a position detection pattern and an alignment pattern are extracted from the original-component-reduced image and aligned to correct the shape of the QR code to a square. Since this method is the same as the known method of extracting a QR-code, its detailed description will be omitted here.

(G) Extracting Bit Information

Then, bit information of each cell is determined from the color of the QR code after alignment. For the QR code, the number p of cells of one side is P=4 m+21 (m=0, 1 . . . ). Accordingly, m can be written as $$m=\text{round}(7(S-3L)/4L) \quad (7)$$

where S is the length (the number of pixels) of one side of the square and L is the mean length of one side of the position detection code. The mean brightness may vary by positions of the code, with the degree of exposure to the light. Accordingly, information on the bit (color) of a cell can be obtained by a method of determining whether the mean brightness of the cell is larger than the mean brightness of a square, D (75/p<=D<=S) each side, with the center of the cell as the center of gravity. The QR code is reproduced by the method and is output. At that time, for a cell whose information is known (the position detection pattern, the alignment pattern, and the timing pattern of FIG. 4(a)), information thereof is not extracted but the existing information is extracted (see FIG. 4).

(H) Correcting Error and Decoding Information

Thereafter, the output QR code is subjected to Reed-Solomon error correction and the information thereof is decoded. FIG. 10(b) is a QR-code reproduced image output from the drawing of FIG. 5(a) by this system.

FIRST EMBODIMENT 1

Figure 11:
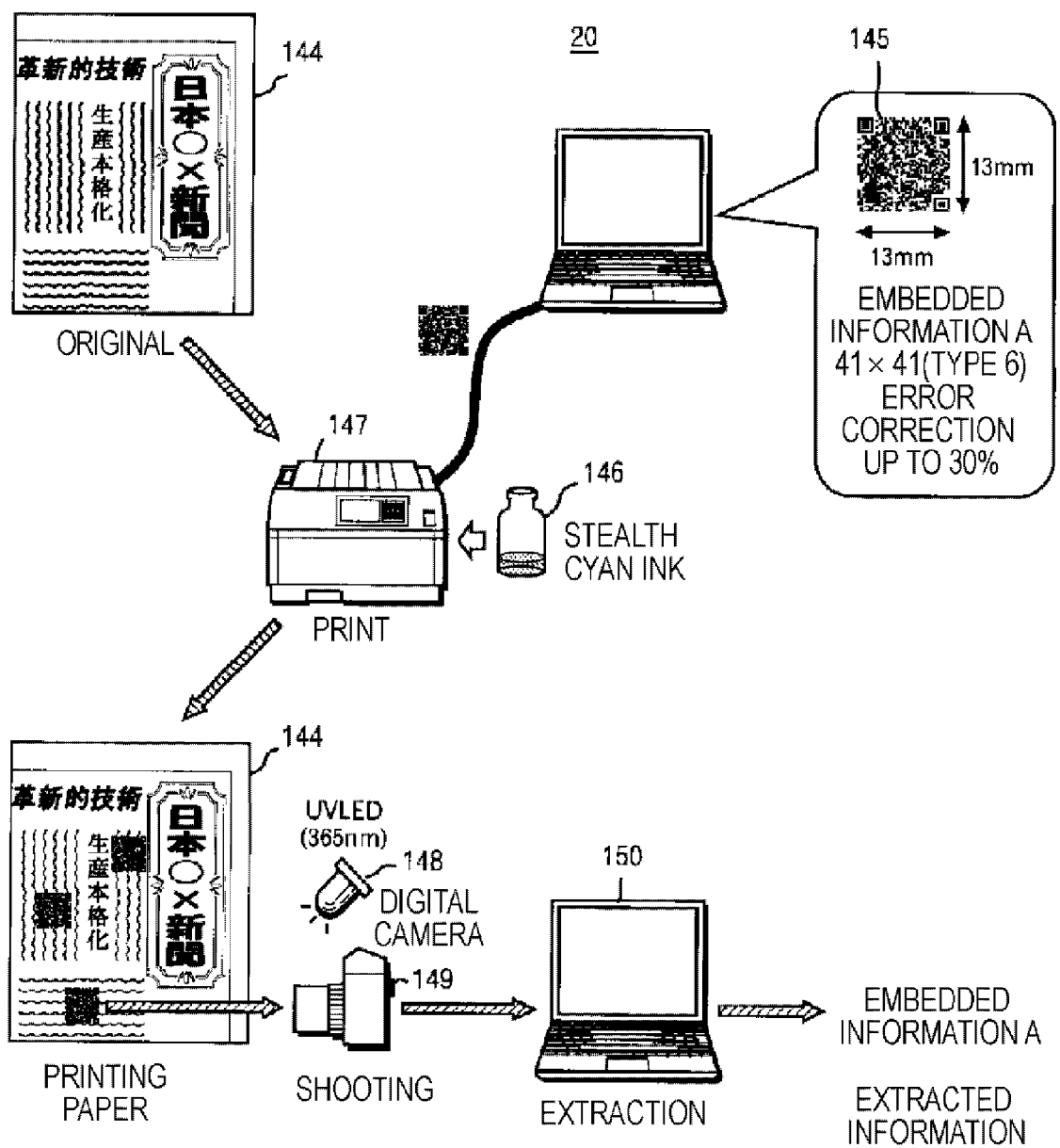
FIG. 11 is a diagram showing the structure of a first embodiment of the invention.

The system of the invention was programmed on a PC and tested by experiment with an arrangement 20 shown in FIG. 11. The details of the experiment are as follows:

1. Original: The front page or a TV page was selected from a newspaper 144.

2. QR code: Embedded information A of FIG. 3 was coded to a QR code 145 of 41×41 (type 6) (with error correction up to 30 percent) and printed in a stealth cyan ink 146 with a printer 147.

3. Shooting: an image taken by a digital camera of three 300K pixels (640×480) under the light from a UV LED 148 of a wavelength of 365 mm and an image taken by a digital camera of 200 M pixels (1600×1200) are taken into a personal computer (PC) 150.

4. Extraction: The image of the QR code is reproduced by the method of the invention and tried for extraction with a commercial extraction program (PsQEdit.exe).

In order to test the effects of (D) calculation of correlation between channels and broadening, (E) creation of original-component-reduced image, and (G) screen splitting at bit extraction, the extraction is also tried by the following methods of 2, 3, and 4, thereby verifying the advantage of the system.

1. Information was extracted by the method of the invention, provided D=0.22 S in step (g).

2. In place of steps (d) and (e), R-component was subtracted from B-component and the information was extracted from an image in which the value was normalized from 0 to 255, provided D=0.22 S in step (g).

3. In step (g), the information was extracted, provided D=S.

4. In the method (2), the information was extracted, provided D=S.

Thirty images of 300K pixels and 19 images of 200 M pixels were used for experiment. Correct embedded information (QR-code information) could be extracted from all the images by the method of the invention. Table 1 shows the results of the experiment. This includes part of the results of the invention although some of them are detected by the methods of (2) and (3). No correct image could be extracted by the method of (4), which does not include any of the methods (steps) (D), (E), and (G). The results show that the method of the invention is advantageous. The results of the method of (3) show that splitting the area at the extraction of bit information was effective particularly for an image with a small number of pixels (only for the image used this time).

TABLE 1

|  | Number of Images from which Correct Information could Be Extracted (640 × 480, 30 pixels in total) | Number of Images from which Correct Information could Be Extracted (1600 × 1200, 19 pixels in total) |
| --- | --- | --- |
| This System | 30 (100%) | 19 (100%) |
| B − R Method | 9 (30%) | 4 (21%) |
| D = S Method | 5 (17%) | 16 (84%) |
| B − R + D = S Method | 0 (0%) | 0 (%) |

SECOND EMBODIMENT

Figure 12:
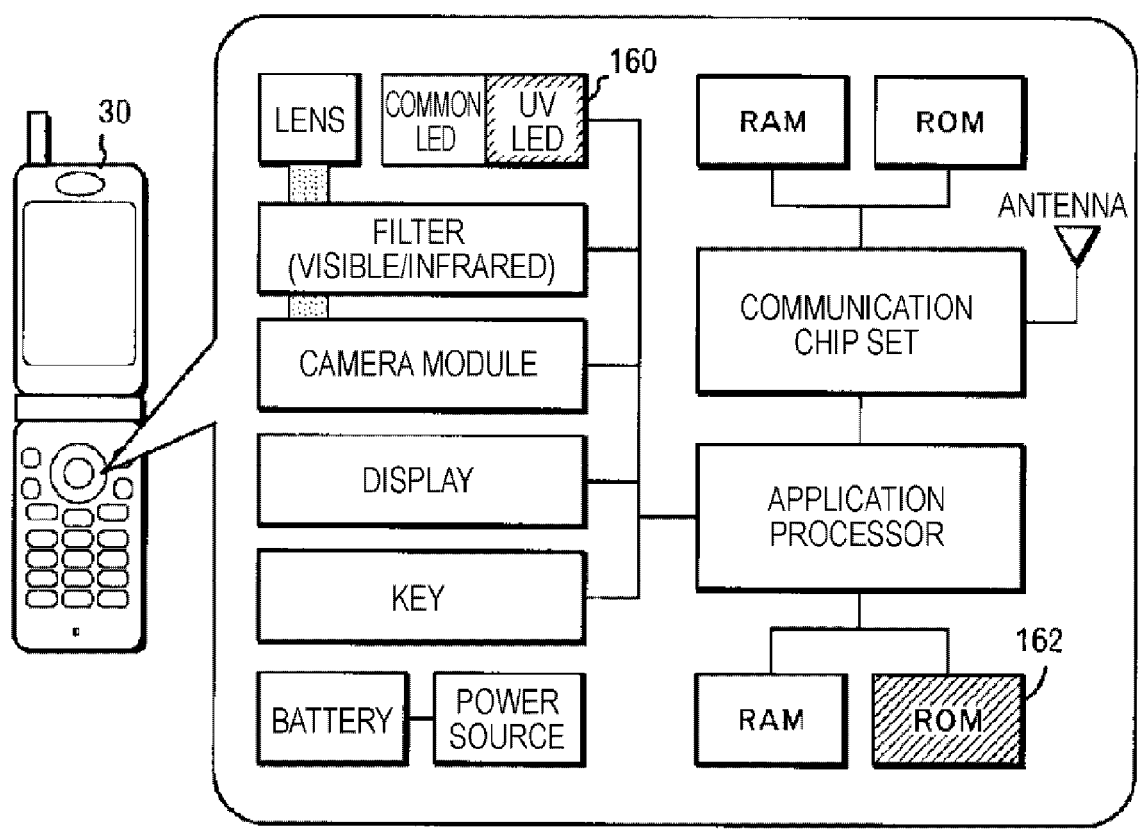
FIG. 12 is a diagram showing an example in which the system of the invention is installed in a mobile phone.

FIG. 12 shows a method of installing the system of the invention in a mobile phone 30. The invention can be applied to a known camera phone only by adding an ultraviolet LED 160, and storing the program of the invention in a ROM 162. In this case, the ultraviolet LED 160 emits light in place of a common LED and its ultraviolet light is radiated on an invisible QR code formed on a newspaper or the like. The QR code is made luminous by the ultraviolet light. The light is received by the camera and taken into a RAM as image information. The captured image information is processed by the above-described method of the invention in accordance with the program stored in the ROM 162. Thus the information embedded in the QR code is extracted.

In addition to mobile phones, the invention can also be applied to video game machines and so on equipped with a latest radio LAN communication facility. For example, by combining a game cartridge having a camera function with an ink that emits ultraviolet light by exposure to ultraviolet light or an ink that emits or absorbs infrared light by exposure to infrared light, a game having a new user interface that allows invisible information to be seen only on a display can be provided. This also provides a method for providing a new game combined with a book or card that embeds treasure or items for use in the game on printed matter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method for extracting invisible information from an object formed by overlapping visible information with a least part of invisible information formed in a stealth ink, comprising:

a step of irradiating the object with light for making the stealth ink luminous;

a step of receiving reflected light from the object;

a step of extracting image information from the received reflected light;

a step of storing the image information;

a step of splitting the image information into a plurality of color channel information;

a step of obtaining a correlation function and broadening pixel values between color channel information on at least one pixel value that forms an image information, for at least two color channel information selected from the color channel information;

a step of reducing a visible information component of one selected color channel information using the correlation function, to perform interpolation, raising image information of the stealth ink and reducing non stealth-ink image information; and a step of extracting invisible information from an interpolated one color channel information by the steps of:

extracting a position detection pattern;
    extracting an alignment pattern;
    correcting distortions with the alignment pattern;
    digitizing colors of cells; and
    determining bit information of the cells from the color channel information after alignment.

2. The method according to claim 1, further comprising a step of specifying a region including the invisible information of the selected color channel information.

3. The method according to claim 1, wherein the step of obtaining a correlation function finds a variation in the pixel values and broadens the pixel values of the other correlation channel information relative to the one selected color channel information and determines the correlation function from the variation.

* * * * *